Feb. 14, 1967  V. MILEWSKI  3,303,555
FINE PITCH MILLING CUTTER
Filed Jan. 4, 1965
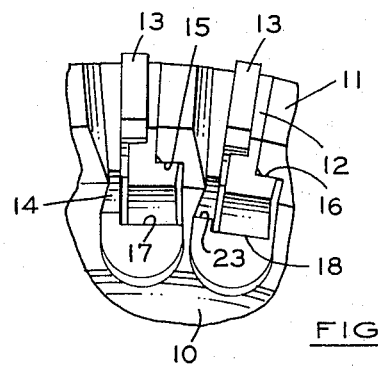
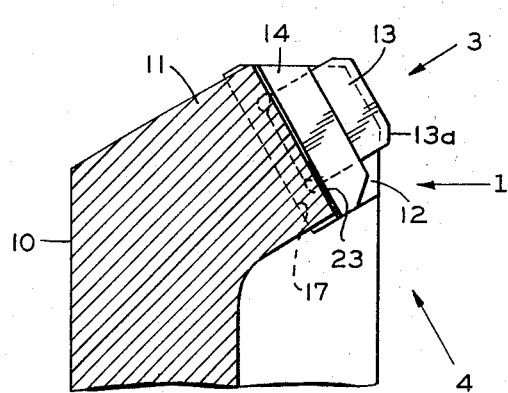
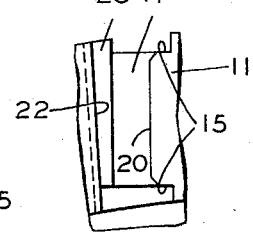
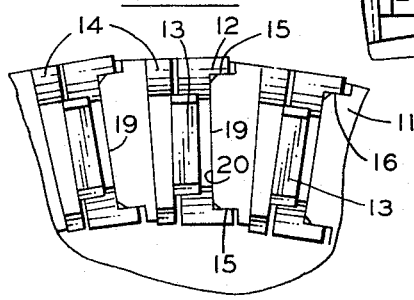
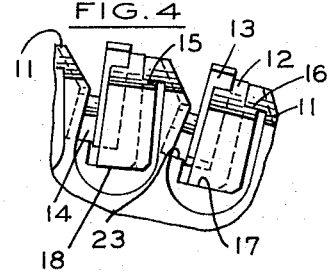
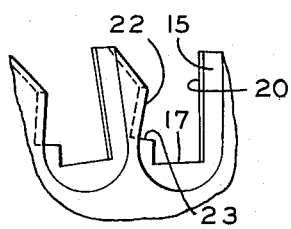
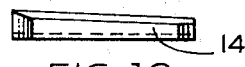
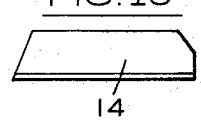
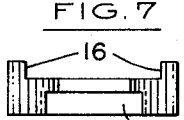
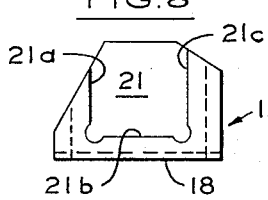
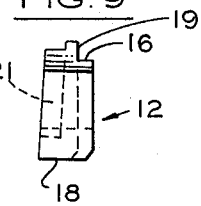
INVENTOR.
VICTOR MILEWSKI
BY *Farley, Forster & Farley*
ATTORNEYS 3,303,555
FINE PITCH MILLING CUTTER
Victor Milewski, Birmingham, Mich., assignor to The Valeron Corporation, Detroit, Mich., a corporation of Michigan
Filed Jan. 4, 1965, Ser. No. 423,235
9 Claims. (Cl. 29—105)

This invention relates to a face milling cutter employing a large number of closely spaced indexable cutting inserts providing a fine pitch for relatively high rates of stock removal and relatively long life between indexing requirements.

This milling cutter is primarily characterized by an annular cutter body having closely spaced perimeter slots within which are mounted precision insert anvils, indexable inserts and wedges. The anvils are located on body projections between slots by ears press-fitting on such projections, each anvil registering also with the cutter body at the bottom of each slot. An indexable cutting insert is seated in a pocket on the anvil face opposite that engaging the body projection and each wedging element engages the exposed insert face and adjacent projection wall of the body. The wedge elements are seated by hammer blows in several progressive tightening stages providing in effect a solid ring through the mutually reactive surfaces of body projection, anvils, cutting inserts and wedges with no screw holes, or adjustment or clamping elements in any way limiting the tightness of assembly or solid ruggedness of the resulting milling cutter. The cutting inserts have no direct contact with the cutter body, and are exactly located by the precision anvils which may be readily replaced if damaged.

The foregoing and other objects of the invention may best be understood from the following detailed description of a preferred embodiment described with reference to the drawings wherein:

FIG. 1 is a fragmentary face view of the outer perimeter of the milling cutter taken along an axial line 1 of FIG. 2 showing a pair of adjacent cutting elements;

FIG. 2 is a fragmentary sectional view taken normal to an axial plane and showing the outer perimeter of the cutter;

FIG. 3 is a fragmentary view taken along the line 3 of FIG. 2 showing three adjacent cutter assemblies;

FIG. 4 is a fragmentary view taken along the line 4 of FIG. 2 showing two of the same cutter assemblies;

FIG. 5 is a view similar to FIG. 3 showing the slotted construction of the cutter body per se with the anvil, insert and wedge elements omitted;

FIG. 6 is a view similar to FIG. 4 with the anvil, insert and wedge elements omitted;

FIG. 7 is a plan view of the anvil per se taken along the line 3 of FIG. 2;

FIG. 8 is a side elevation of the anvil per se;

FIG. 9 is an end elevation of the anvil;

FIG. 10 is a side elevation of the wedge element per se; and

FIG. 11 is a plan view of such wedge element.

Referring to FIGS. 1–4 the cutter includes an annular body 10 having a dished face terminating in a slotted outer perimeter providing a series of projecting lugs 11 between which are assembled, an anvil 12, cutting insert 13 and wedge 14. As best shown in FIG. 3, each projecting lug of the cutter body is provided with a pair of shoulders 15 which locate a pair of projecting ears 16 of each anvil, the slot terminating in a surface 17 normal to the shoulders 15 serving to locate the lower anvil surface 18. The shoulders 15 and ears 16 are dimensioned for a light press fit and preferably with a matching slight taper in the order of one-half degree to aid in assembly. The anvil elements are tapped home to a seated position with the aid of an assembly wedge not shown which urges the abutting face 19 of the anvil against the abutting face 20 of the lug and once initially assembled the anvil becomes a permanent part left on the cutter body in the absence of damage thereto requiring replacement. A pocket 21 having three sides 21a, 21b and 21c, as best shown in FIGS. 7 and 8, serves to locate the indexable cutting element 13, in this case a flat, square element having beveled corners 13a to match the cutting face in assembled position. Each wedge 14 as best shown in FIGS. 3, 4, 10 and 11 is provided with a double taper including a longitudinal taper in the order of three degrees and an end view taper in the order of four degrees matching a corresponding taper in the slot wall 22 which urges the wedge against the corner seating surface 23 in the cutter body.

In assembling the cutter elements 13 within the anvil pocket 21 each insert is held with edge surfaces registering against the corner formed by pocket sides 21b and 21c, while the wedge is inserted and set lightly with a spring loaded insert tool. This procedure is repeated for all cutting inserts around the entire perimeter of the milling cutter, whereupon the wedges are driven further with a solid punch and lightweight hammer providing a medium impact setting of the wedges progressively around the perimeter cutter. The process is then repeated with a solid punch and hammer providing a harder shock drive in setting wedges with all of the respective reaction surfaces of the cutter body lugs, anvils, cutting inserts and wedges providing a substantially solid ring relieved only in the area for chip clearance ahead of the cutting edge of the insert. Because of the high order of compressive force providing frictional engagement of the cutting insert between opposed holding surfaces of the anvil and wedge it has been found possible, contrary to conventional practice, to locate the cutting element against the leading pocket surface 21c as distinguished from a backup surface 21a which would be required if the frictional grip of the wedge were inadequate to resist forces imposed on the cutting insert by face cutting pressures. Due to such forward registration of the cutter insert in the direction of cutting action it has been further found that the dimensional tolerances determining the face runout of the cutting edge 13a are more readily held than where a backup surface is used for registration involving additional dimensional tolerances of the cutting insert per se so that it has become practical to entirely eliminate any adjustment provision, greatly increasing the economy of construction as well as improving the rigidity, eliminating all threaded screw holes and permitting an unusually fine pitch through close spacing of cutting inserts.

It will be understood that desired rake angles may be incorporated in the slot walls in order to accommodate cutting inserts having edge surfaces normal to the parallel faces thereby doubling the number of index positions. In the particular milling cutter illustrated a 7° negative radial rake and 5° negative axial rake have been provided with 44 slots in a cutter having a 10-inch effective diameter.

It will be further understood that numerous modifications in detailed construction including, for example, the number of sides of the cutting inserts, may be resorted to without departing from the scope of the invention as defined in the following claims.

I claim:
1. A cutting tool comprising an annular cutter body having a plurality of projecting lugs extending angularly from an end face of said body with slots therebetween, a locating element accurately oriented and interlocked on each lug, said locating element having cutting insert edge and face locating means therein, a cutting element, and frictionally retained wedge means reacting against said cutting element and adjacent lug wall for forcing said cutting element in compressive engagement with said locating element.

2. A cutter as set forth in claim 1 wherein said locating element has a pocket recess accommodating a square cutter insert, one shoulder of said pocket recess limiting the axial movement of the leading cutting edge in the direction of cutting action.

3. A cutter as set forth in claim 1 wherein said locating element has a pocket recess accommodating a square cutter insert, said recess having right-angularly disposed locating surfaces adapted to engage matching edge surfaces of said cutting insert, one shoulder of said pocket recess limiting the axial movement of the leading cutting edge in the direction of cutting action.

4. A cutter as set forth in claim 1 wherein said locating element has a pocket recess accommodating said cutter insert, said recess having angularly disposed locating surfaces adapted to engage matching edge surfaces of said cutting insert, one of said locating surfaces being engaged by cutting element movement in a direction of wedge movement and opposite to operating face pressure.

5. A cutter as set forth in claim 1 wherein said locating element has a pocket recess accommodating said cutter insert, said recess having angularly disposed locating surfaces adapted to engage matching edge surfaces of said cutting insert, one of said locating surfaces being engaged by cutting element movement in a direction of wedge movement and opposite to operating face pressure, said locating element having a three-sided pocket for accommodating a square insert.

6. A cutter as set forth in claim 1 wherein said locating element has a three-sided pocket corresponding to three edge surfaces of said cutting element.

7. A cutter as set forth in claim 1 wherein said locating element has a three-sided pocket corresponding to three edge surfaces of said cutting element, said cutting element having a square configuration.

8. A cutter as set forth in claim 1 wherein said locating element has a face engaging said lug, a pair of ears engaging opposite shoulders of said lug, an abutting surface engaging the bottom of said slot, and a three-sided pocket for confining corresponding side edges of said cutting insert.

9. A cutter as set forth in claim 8 wherein said cutting element has a square configuration.

References Cited by the Examiner
UNITED STATES PATENTS
3,138,847   6/1964   Berry _____ 29—105

WILLIAM W. DYER, Jr., *Primary Examiner.*

HARRISON L. HINSON, *Examiner.*